United States Patent [19]

Jordan

[11] Patent Number: 5,826,095
[45] Date of Patent: Oct. 20, 1998

[54] METHOD AND APPARATUS FOR MAINTAINING THE ORDER OF DATA ITEMS PROCESSED BY PARALLEL PROCESSORS

[75] Inventor: Stephen D. Jordan, Fort Collins, Colo.

[73] Assignee: Hewlett-Packard Company, Palo Alto, Calif.

[21] Appl. No.: 703,713

[22] Filed: Aug. 27, 1996

[51] Int. Cl.[6] .................................................. G06F 13/00
[52] U.S. Cl. ............................... 395/800.11; 395/800.01; 395/800.02; 395/800.04; 395/800.07; 395/800.09; 395/800.15; 395/800.16; 395/800.23; 395/800.26; 364/131; 364/133; 364/231.9; 364/251.3
[58] Field of Search .......................... 395/800.01, 800.11, 395/800.15, 800.02, 800.16, 800.04, 800.07, 800.09, 800.26, 23; 364/133, 131, 231.9, 251.3

[56] References Cited

U.S. PATENT DOCUMENTS

| | | | |
|---|---|---|---|
| 4,380,046 | 4/1983 | Fung | 364/200 |
| 4,833,599 | 5/1989 | Cowell et al. | 264/200 |
| 4,901,224 | 2/1990 | Ewert | 364/200 |
| 5,243,699 | 9/1993 | Nikolls et al. | 395/275 |
| 5,581,778 | 12/1996 | Chin et al. | 395/800 |
| 5,655,133 | 8/1997 | Dppreee et al. | 395/800.23 |
| 5,710,932 | 1/1998 | Hamanaka et al. | 395/800 |
| 5,724,600 | 3/1998 | Ogi | 395/800 |

OTHER PUBLICATIONS

Lin et al, "A Fixible Parallel Architecture for Relaxation Labling Agorithms", IEEE vol. 4, No. 5, pp. 1231–1240, May 5, 1992.

*Primary Examiner*—Larry D. Donaghue
*Assistant Examiner*—Dzung C. Nguyen

[57] ABSTRACT

A data processing system includes two or more parallel processors, a distributor and a combiner. The processors process input data items and generate corresponding output data items. The distributor includes an input counter for generating an ID corresponding to each of the input data items and a distributor for placing the input data items and the corresponding ID's in processor input words and distributing each of the processor input words to selected ones of the processors in accordance with a distribution algorithm. The combiner receives from the processors processor output words containing the output data items and the corresponding ID's. The combiner includes an output counter for generating an output count and comparators for comparing the output count with the ID's in the processor output words. The combiner further includes a combining circuit for transferring an output data item to an output data stream in response to detection by one of the comparators of a match condition between the output count and an ID corresponding to the output data item to be transferred. As a result, the data items in the output data stream have the same order as the data items in the input data stream.

14 Claims, 2 Drawing Sheets

METHOD AND APPARATUS FOR MAINTAINING THE ORDER OF DATA ITEMS PROCESSED BY PARALLEL PROCESSORS

FIELD OF THE INVENTION

This invention relates to processing of data in parallel processors and, more particularly, to methods and apparatus for maintaining the order of data items processed by parallel processors that may have different processing delays.

BACKGROUND OF THE INVENTION

Parallel processing is commonly used in computing applications which are computation intensive and which require high speed. Applications include, but are not limited to, image processing operations which require mathematical processing of pixel values in an image and graphics operations which require mathematical processing of large quantities of primitive data. Input data items are received in an input data stream from a data source, such as a host computer, and are distributed among the parallel processors in accordance with a predetermined distribution algorithm. The data items are processed concurrently in each processing channel, and the output data items are combined into a single output data stream. Typically, the order of the data items in the output data stream must be the same as the order of the data items in the input data stream. The parallel processing channels may have unequal delays. Furthermore, the processing channels may receive input data items at different times and in different numbers. As a result, output data items may appear at the outputs of the parallel processing channels in a different order than they were input. It may, therefore, be difficult to combine the output data items into the output data stream in the proper order.

A system for distributing command/data packets to parallel processing units on a "first come, first served" basis is disclosed in U.S. Pat. No. 5,325,493 issued Jun. 28, 1994 to Herrell et al. Each command is assigned a processor ID, and the processed data is combined by sequentially reading outputs of the processing units in an order specified by the ID values. The disclosed system provides satisfactory performance but is relatively complex.

SUMMARY OF THE INVENTION

In accordance with one aspect of the invention, a data processing system is provided. The system comprises a plurality of parallel processors, a distributor and a combiner. The processors process input data items from an input data stream and generate corresponding output data items. The distributor includes an input counter for generating an ID corresponding to each of the input data items, and a distributing circuit for placing the input data items and the corresponding ID's in processor input words and distributing each of the processor input words to selected ones of the processors in accordance with a distribution algorithm. The input counter is advanced to its next state in association with receipt of at least selected ones of the input data items in the input data stream. Each of the processors receives and processes the processor input words and provides processor output words containing the output data items and the corresponding ID's. The combiner receives each of the processor output words from the processors. The combiner includes an output counter for generating an output count and comparators for comparing the output count with the ID's in the processor output words. The output counter has the same number of states as the input counter and is advanced to its next state in association with transfer of at least selected ones of the output data items to an output data stream. The combiner further includes a combining circuit for transferring an output data item to the output data stream in response to detection by one of the comparators of a match condition between the output count and an ID corresponding to the output data item to be transferred. As a result, the data items in the output data stream have the same order as the data items in the input data stream.

The distributing circuit may include a staging register for holding each of the processor input words, a distribution register corresponding to each of the processors and a path selection controller for transferring each of the processor input words from the staging register to a selected one of the distribution registers in accordance with the distribution algorithm. The combining circuit may comprise an output register corresponding to each of the processors for receiving the processor output words from the respective processors, a combining multiplexer for selecting an output data item from one of the output registers, a combining register for holding the selected output data item; and a combining controller responsive to the match condition for providing a select signal to the combining multiplexer.

An ID field may include bits in addition to the ID value. A broadcast bit may be used to indicate that all processing channels are processing a common data item and are to be unloaded together. A data expansion bit may be used to indicate that one input data item produces a group of two or more output data items. The data expansion bit causes advancement of the output counter to be inhibited until the group of output data items is transferred to the output data stream. A data reduction bit may be used to indicate that a group of two or more input data items produces a single output data item. Advancement of the input counter may be inhibited by the data reduction bit, and input data items of the group are transferred to the selected processor with the same ID value.

According to another aspect of the invention, a method is provided for maintaining input data items and output data items in the same order in a processing system comprising of a plurality of parallel processors. An ID corresponding to each of the input data items is generated with an input counter, and the input counter is advanced to its next state in association with receiving at least selected ones of the input data items in the input data stream. The input data items and the corresponding ID's are placed in processor input words, and each of the processor input words is distributed to selected ones of the processors in accordance with a distribution algorithm. The processors receive and process the processor input words and provide processor output words containing the output data items and the corresponding ID's. An output count is generated with an output counter, and the output count is compared with the ID's in the processor output words. When a match condition is detected between the output count and one of the ID's, the corresponding output data item is transferred to an output data stream. The output counter is advanced to its next state in association with the step of transferring at least selected ones of the output data items to the output data stream.

BRIEF DESCRIPTION OF THE DRAWINGS

For better understanding of the present invention, reference is made to the accompanying drawings, which are incorporated herein by reference and in which.

DETAILED DESCRIPTION

Figure 1:
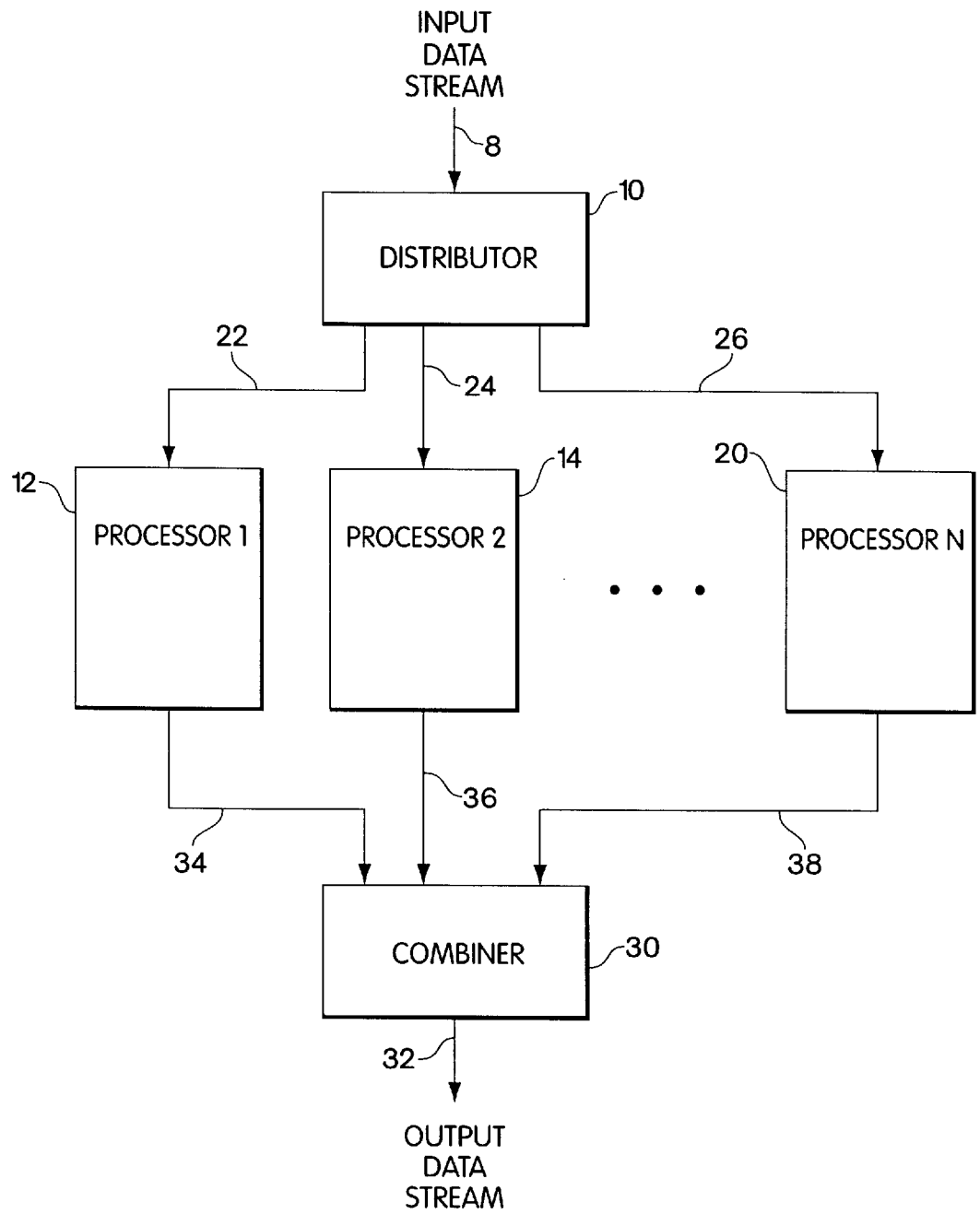
FIG. 1 is a schematic block diagram of a data processing system in accordance with the invention.

A block diagram of a data processing system in accordance with the invention is shown in FIG. 1. An input data stream from a data source, such as a host computer, is supplied to a distributor 10 on an input bus 8. The input data stream typically comprises a serial stream of input data items, each having a predetermined number of bits. The input data bus 8 may, for example, have 32 bits. The input data items may comprise data values, instructions, addresses and combinations thereof, all or part of which require processing. The processing system further includes processors 12, 14, . . . 20 connected to the output of distributor 10. The system may include two or more processors, with the number of processors depending on the application. Each processor may have multiple stages and may, for example, perform mathematical and/or logical operations on the input data items. The processing system of FIG. 1 is shown with separate buses 22, 24, . . . 26 interconnecting distributor 10 and processors 12, 14, . . . 20, respectively. However, a common data bus may be used to interconnect the distributor 10 and the processors.

The distributor 10 distributes different input data items of the input data stream to different processors in accordance with a distribution algorithm. For example, the input data items may be distributed to processors 12, 14, . . . 20 in a sequential, circulating fashion. In another approach, the distribution algorithm may be data dependent. In this case, the distributor 10 tests specified bits in the input data items to determine how the data items will be distributed among the processors. In general, any distribution algorithm may be utilized within the scope of the present invention.

The processors 12, 14, . . . 20 process the respective input data items in accordance with preprogrammed instructions or in accordance with commands contained in the input data items and provide output data items at outputs thereof. The output data items are supplied to a combiner 30, which combines the output data items into a single output data stream on an output bus 32. As indicated above, the data items in the output data stream are required to have the same order as the data items in the input data stream. Although the processors 12, 14, . . . 20 are shown in FIG. 1 as connected to combiner 30 by separate data buses 34, 36, . . . 38, respectively, it will be understood that a common data bus may be utilized for supplying output data items from the processors 12, 14, . . . 20 to combiner 30.

The processors 12, 14, . . . 20, in general, may require different times for processing the input data items. Thus, although input data items are supplied to the processors in a known order, the output data items may appear at the processor outputs in a different order. The system must ensure that the output data items are combined so that the data items in the output data stream have the same order as the data items in the input data stream.

Figure 2:
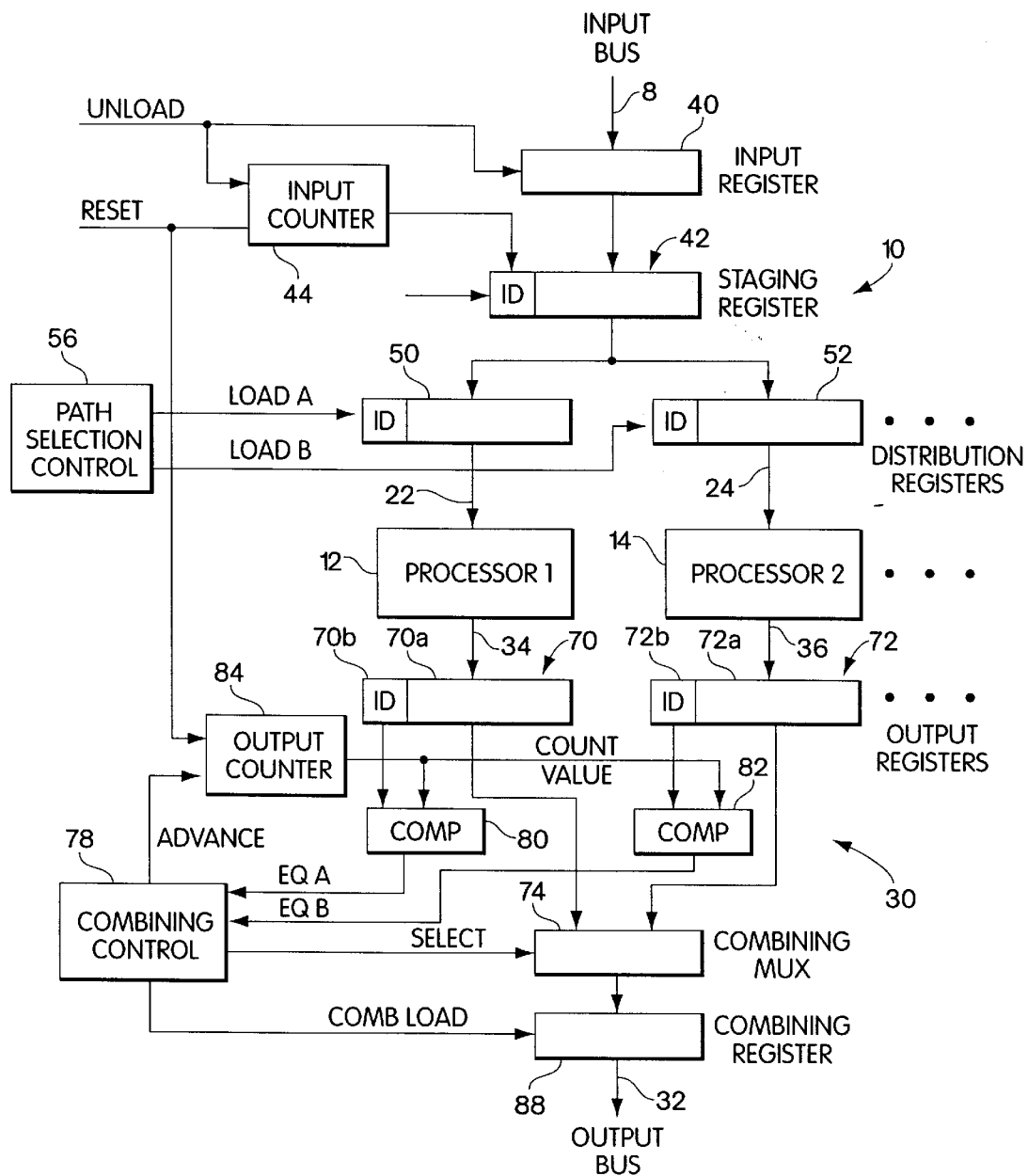
FIG. 2 is a schematic block diagram of an example of the distributor and the combiner shown in FIG. 1.

A block diagram of an example of the distributor 10 and the combiner 30 is shown in FIG. 2. Input data items in the input data stream are supplied on input bus 8 to an input register 40. An unload signal supplied to input register 40 transfers data items to a data field 42a of a staging register 42. The unload signal also advances an input counter 44. The count value of input counter 44 is supplied as an identification (ID) to an ID field 42b of staging register 42. The ID is associated with and corresponds to the data item in the data field 42a of staging register 42. Each data item and its corresponding ID constitutes a processor input word. The output of staging register 42 is connected to distribution registers 50 and 52. Each of the distribution registers corresponds to one of the processors shown in FIG. 1. Only two processing channels are illustrated in FIG. 2 for ease of illustration. The outputs of distribution registers 50 and 52 are supplied on buses 22 and 24 to processors 12 and 14, respectively. The loading of registers 50 and 52 is controlled by a path selection controller 56. Each processor input word contained in staging register 42 is transferred to distribution register 50 or to distribution register 52 under control of the path selection controller 56. The path selection controller 56 provides load control signals to registers 50 and 52 in accordance with a distribution algorithm. Processor input words may be loaded into distribution registers 50 and 52 and transferred from there into the respective processors in any desired order. The number of data items distributed to each processing channel is not necessarily equal.

The processors 12 and 14 process the input data items in each processor input word and supply processor output words on buses 34 and 36, respectively. Each processor output word includes an output data item and a corresponding ID. The ID's are not modified as they pass through the processors. The processors 12, 14, . . . 20 each typically comprise an arithmetic logic unit (ALU) with access to a memory. The processors may have the same or different configurations and can perform the same or different operations on the input data items.

The combiner 30 includes output registers 70 and 72, one corresponding to each of the processors in the processing system. Output register 70 receives processor output words from processor 12 on bus 34, and output register 72 receives processor output words from processor 14 on bus 36. Each of the output registers 70 and 72 includes a data field, which holds the output data item, and an ID field, which holds the corresponding ID. A data field 70a of register 70 is connected to a first input of a combining multiplexer 74, and a data field 72a of register 72 is connected to a second input of combining multiplexer 74. A combining controller 78 supplies a select signal to combining multiplexer 74. An ID field 70b of register 70 is supplied to a first input of a comparator 80, and an ID field 72b of register 72 is supplied to a first input of a comparator 82. An output counter 84 supplies an output count to a second input of comparator 80 and to a second input of comparator 82. Each of the comparators 80, 82 compares the output count of output counter 84 with the ID of the processor output word stored in the respective registers 70 and 72. As indicated above, the ID represents the count value of input counter 44 at the time when the ID was loaded into staging register 42. Output signals of comparators 80 and 82, which indicate that the respective first and second inputs are equal, are supplied to combining controller 78. When a match condition occurs, indicating that the ID value in one of the output registers is equal to the output count of counter 84, the combining controller 78 provides a select signal to combining multiplexer 74. The output data item corresponding to the ID for which a match condition occurred is transferred by multiplexer 74 from the appropriate output register into a combining register 88. The combining register 88 supplies the selected output data item on output bus 32.

After a decision is made as to the output data item to be combined onto output bus 32, the output counter 84 is advanced to its next state by combining controller 78. The procedure described above is repeated for the next group of processor output words in output registers 70 and 72. When a match condition between the output count and the ID is detected, the corresponding output data item is selected by multiplexer 74 and is transferred into combining register 88. The output data items form an output data stream. The data items in the output data stream have the same order as the data items in the input data stream.

In processing systems having more than two processing channels, the distributor 10 has additional distribution registers and the path selection controller 56 provides a select line to each distribution register. In processing systems having more than two processors, the combiner 30 includes an output register and a comparator for each processor. The combining multiplexer 74 is provided with one selectable input corresponding to each processor.

The input counter 44 and the output counter 84 function together to ensure that the data items in the output data stream have the same order as the data items in the input data stream. Each of the counters is configured to count through a predetermined number of states and then repeat in a recirculating fashion. The number of states in the input counter is the same as the number of states in the output counter 84. Preferably, both counters are reset by the same signal. The number of states in each counter depends on the maximum skew that may be expected between different processing channels. The skew is defined as maximum difference in ID values that may occur in output registers 70 and 72. The skew may result from unequal delays through the processing channels, from loading more data items into one channel than the other or a combination of these factors. The number of states in each of the input counter and the output counter should be greater than the maximum skew in ID values. Thus, for example, four-bit counters and four-bit ID's are sufficient to accommodate a maximum skew of 15 between processing channels.

Operation of the processing system of FIGS. 1 and 2 may be illustrated by way of example. Assume that input counter 44 and output counter 84 have been reset. Further assume that four input data items are received on input bus 8 for processing. The first three data items are assigned ID's of 0, 1 and 2, respectively, and are distributed via distribution register 50 to processor 12. The fourth input data item is assigned an ID of 3 and is transferred via distribution register 52 to processor 14. The input counter 44 is advanced to the next state in association with the transfer of each input data item. Further assume that the fourth input data item in processor 14, having an ID of 3, reaches output register 72 before the first input data item in processor 12, having an ID of 0, reaches output register 70.

The reset output counter 84 contains an output count of zero. When the fourth output data item having an ID of 3 reaches output register 72, the comparator 82 does not indicate a match condition between the output count and the ID value, and the fourth output data item is not transferred from output register 72. When the first output data item, having an ID of 0, reaches output register 70, comparator 80 indicates a match condition between the ID value and the output count of counter 84, and the first data item is transferred from output register 70 via multiplexer 74 and register 88 to output bus 32. The output counter 84 is then advanced to its next state and contains an output count of 1. When the second output data item reaches register 70, a match condition is indicated, and the second data item is transferred to output bus 32. The output counter 84 is advanced to an output count of 2, and the third output data item is transferred to output bus 32. The output counter is then incremented to an output count of 3, and the comparator 82 indicates a match condition between the ID value in output register 72 and the output count of counter 84. In response to the match condition, the fourth output data item is transferred from output register 72 to output bus 32. Thus, the data items in the output data stream are maintained in their original order, despite the fact that the fourth output data item reached the combiner 30 first.

Bits can be added to the ID field to handle special situations. For example, a broadcast bit may be used to indicate that all processing channels are processing a common data item and are to be unloaded together. The broadcast bit is set at staging register 42 and constitutes an additional bit in ID field 42b. The broadcast bit indicates to combining controller 78 that the output data items are not to be transferred to the output data stream until a match condition between the output count and the corresponding ID is detected in all processing channels. In a second example, a data expansion bit may be used to indicate that two or more output data items are to be unloaded together, such as, for example, when one input data item produces two or more output data items. The data expansion bit is sensed by the combining controller 78 and causes the advancement of the output counter 84 to be inhibited until the last output data item of the group is received by the respective output register. The output data items in the group are unloaded from the same output register until all items in the group have been transferred to the output data stream. In a third example, a data reduction bit may be used to indicate that two or more input data items of a group produce a single output data item. In this case, advancement of the input counter 44 is inhibited, and all input data items of the group are transferred to the selected processor with the same ID value.

While there have been shown and described what are at present considered the preferred embodiments of the present invention, it will be obvious to those skilled in the art that various changes and modifications may be made therein without departing from the scope of the invention as defined by the appended claims.

I claim:

1. A data processing system comprising:

a plurality of parallel processors for processing input data items from an input data stream and generating corresponding output data items, each of said processors having an input and an output;

a distributor including an input counter for generating an ID corresponding to each of said input data items and a distributing circuit for placing said input data items and said corresponding ID's in processor input words and for distributing each of said processor input words to selected ones of said processors in accordance with a distribution algorithm, said input counter being advanced to its next state in association with receipt of each input data item in the input data stream, each of said processors receiving said processor input words at the input thereof and providing at the output thereof processor output words containing said output data items and said corresponding ID's; and a combiner for receiving each of said processor output words from said processors, said combiner including an output counter for generating an output count, said output counter having the same number of states as said input counter, said output counter being advanced to its next state in association with transfer of each of said output data items to an output data stream, said combiner further including comparators for comparing said output count with the ID's in said processor output words and a combining circuit for transferring an output data item to the output data stream in response to detection by one of said comparators of a match condition between said output count and an ID corresponding to the output data item to be transferred, wherein the output data items in said output data stream have the same order as the input data items in said input data stream.

2. A processing system as defined in claim 1, wherein said distributing circuit includes a staging register for holding each of said processor input words, a distribution register corresponding to each of said processors and a path selection controller for transferring each of said processor input words from said staging register to a selected one of said distribution registers in accordance with said distribution algorithm.

3. A processing system as defined in claim 1, wherein said combining circuit comprises an output register corresponding to each of said processors for receiving said processor output words from the respective processor, a combining multiplexer for selecting an output data item from one of said output registers, a combining register for holding the selected output data item and a combining controller responsive to said match condition for providing a select signal to said combining multiplexer.

4. A processing system as defined in claim 1, wherein said input counter and said output counter each have a number of states that is greater than a maximum skew in ID values in said processing circuits.

5. In a processing system comprising a plurality of parallel processors for processing input data items from an input data stream and generating corresponding output data items, a method for maintaining said input data items and said output data items in the same order, comprising the steps of:

with an input counter, generating an ID corresponding to each of said input data items;

advancing said input counter to its next state in association with receiving at least selected ones of said input data items in the input data stream;

placing said input data items and said corresponding ID's in processor input words;

distributing each of said processor input words to selected ones of said processors in accordance with a distribution algorithm;

each of said processors receiving said processor input words at an input thereof and providing at an output thereof processor, output words containing said output data items and said corresponding ID's;

generating an output count with an output counter;

comparing said output count with the ID's in said processor output words;

transferring an output data item to an output data stream when a match condition is detected between said output count and an ID corresponding to the output data item to be transferred; and advancing said output counter to its next state in association with transferring at least selected ones of said output data items to the output data stream.

6. A method as defined in claim 5, further including the step of resetting said input counter and said output counter substantially simultaneously.

7. A method as defined in claim 5, wherein said input counter and said output counter are advanced through equal numbers of states.

8. A method as defined in claim 5, wherein the step of distributing each of said processor input words includes distributing a processor input word to all processors in response to a broadcast bit.

9. A method as defined in claim 5, further including the step of inhibiting advancement of the output counter, in response to a data expansion bit, until two or more output data items are transferred to the output data stream.

10. A method as defined in claim 5, further including the step of inhibiting advancement of the input counter in response to a data reduction bit and transferring two or more input data items having the same ID value to a selected one of said processors.

11. A data processing system comprising:

a plurality of parallel processors for processing input data items from an input data stream and generating corresponding output data items, each of said processors having an input and an output;

a distributor including an input counter for generating an ID corresponding to each of said input data items and a distributing circuit for placing said input data items and said corresponding ID's in processor input words and for distributing each of said processor input words to selected ones of said processors in accordance with a distribution algorithm, said input counter being advanced to its next state in association with distribution of at least selected ones of said input data items to said processors, each of said processors receiving said processor input words at the input thereof and providing at the output thereof processor output words containing said output data items and said corresponding ID's; and a combiner for receiving each of said processor output words from said processors, said combiner including an output counter for generating an output count, said output counter having the same number of states as said input counter and being advanced to its next state in association with transfer of at least selected ones of said output data items to an output data stream, said combiner further including means for comparing said output count with the ID's in said processor output words and a combining circuit for transferring an output data item to said output data stream in response to detection by said comparison means of a match condition between said output count and an ID corresponding to the output data item to be transferred, wherein the output data items in said output data stream have the same order as the input data items in said input data stream.

12. A processing system as defined in claim 11, wherein said ID field further includes a broadcast bit, wherein said distributor further includes means responsive to said broadcast bit for distributing an input data item corresponding to said broadcast bit to each of said processors and wherein said combiner further includes means responsive to said broadcast bit for transferring output data items to said output data stream only after a match condition is detected between said output count and the corresponding ID in processor output words from all of said processors.

13. A processing system as defined in claim 11, wherein said ID field further includes a data expansion bit, which indicates that two or more output data items are to be unloaded together, and wherein said combiner includes means responsive to said data expansion bit for inhibiting advancement of the output counter until said two or more output data items are transferred to the output data stream.

14. A processing system as defined in claim 11, wherein said ID field further includes a data reduction bit, which indicates that two or more input data items of a group produce a single output data item, and wherein said distributor further includes means responsive to said data reduction bit for inhibiting advancement of the input counter and for transferring the input data items of said group to the selected processor with the same ID value.

* * * * *